US012413483B2

(12) United States Patent
Batlle et al.

(10) Patent No.: US 12,413,483 B2
(45) Date of Patent: Sep. 9, 2025

(54) SYSTEMS AND METHODS FOR USING BOTTLENECK STRUCTURES TO IMPROVE PERFORMANCE OF MACHINE LEARNING-BASED MODELING

(71) Applicant: QUALCOMM Incorporated, San Diego, CA (US)

(72) Inventors: Alex Batlle, Arenys de Munt (ES); Jordi Ros Giralt, Vilafranca del Penedes (ES); Aleix Segui, Tarrega (ES)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/313,103

(22) Filed: May 5, 2023

(65) Prior Publication Data

US 2024/0372787 A1 Nov. 7, 2024

(51) Int. Cl.
*H04L 41/147* (2022.01)
*H04L 41/12* (2022.01)
*H04L 41/16* (2022.01)
*H04L 43/0829* (2022.01)
*H04L 43/0852* (2022.01)
*H04L 43/0882* (2022.01)
*H04L 43/0894* (2022.01)

(52) U.S. Cl.
CPC ............ *H04L 41/147* (2013.01); *H04L 41/12* (2013.01); *H04L 41/16* (2013.01); *H04L 43/0829* (2013.01); *H04L 43/0852* (2013.01); *H04L 43/0882* (2013.01); *H04L 43/0894* (2013.01)

(58) Field of Classification Search
CPC ....... H04L 41/147; H04L 41/12; H04L 41/16; H04L 43/0829; H04L 43/0852; H04L 43/0882; H04L 43/0894
See application file for complete search history.

(56) References Cited

U.S. PATENT DOCUMENTS

| | | | |
|---|---|---|---|
| 9,015,093 B1 * | 4/2015 | Commons | G01C 21/3602 706/26 |
| 2015/0364022 A1 * | 12/2015 | Dyell | G16H 40/63 340/573.1 |
| 2016/0098629 A1 * | 4/2016 | Lipasti | G06N 3/08 706/26 |

(Continued)

OTHER PUBLICATIONS

"On the Bottleneck Structure of congestion-controlled Networks". Proc.ACM Meas. Anal. Comput. Syst., vol. 3, Article 59, Publication date: Dec. 2019. (Year: 2019).*

(Continued)

*Primary Examiner* — Brian Whipple
(74) *Attorney, Agent, or Firm* — Seyfarth Shaw LLP

(57) ABSTRACT

A processor-implemented method for generating a digital model of a communications system using a bottleneck structure includes receiving information associated with a communications system including multiple elements. Each of the elements is configured to communicate with other elements of the communications system. A bottleneck structure is generated based on the information associated with the communications system. An artificial neural network (ANN) processes the bottleneck structure and the information associated with the communications system to generate a digital model corresponding to the communications system.

26 Claims, 9 Drawing Sheets

(56) References Cited

U.S. PATENT DOCUMENTS

2021/0097443 A1* 4/2021 Li .......................... G06N 5/04
2022/0124543 A1* 4/2022 Orhan .................. G06N 3/006

OTHER PUBLICATIONS

Behringer M., et al., "Autonomic Networking: Definitions and Design Goals", Internet Research Task Force, Request for Comments: 7575, ISSN: 2070-1721, Jun. 2015, pp. 1-16.
Cai H., et al., "Enable Deep Learning on Mobile Devices: Methods, Systems, and Applications", ACM Transactions on Design Automation of Electronic Systems, vol. 27, No. 3, Article 20, Nov. 2021, pp. 1-50.
Jia Z., et al., "Beyond Data and Model Parallelism for Deep Neural Networks", arXiv:1807.05358v1 [cs.DC] Jul. 14, 2018, pp. 1-15.
Na H., et al., "LSTM-Based Throughput Prediction for LTE Networks", The Korean Institute of Communications and Information Sciences, ICT Express, 2021, pp. 1-5.
Rusek K., et al., "Unveiling the Potential of Graph Neural Networks for Network Modeling and Optimization in SDN", In Proceedings of the ACM Symposium on SDN Research, arXiv:1901.08113v3 [cs.NI], Oct. 28, 2019, pp. 1-12.
Zhou C., et al., "Digital Twin Network: Concepts and Reference Architecture", Internet Research Task Force, draft-irtf-hmrg-network-digital-twin-arch-03, Apr. 27, 2023, 25 Pages.

* cited by examiner

Algorithm 1A GradientGraph

Input: $\mathcal{N} = (\mathcal{L}, \mathcal{F}, \{c_l, \forall l \in \mathcal{L}\})$:
1: $\mathcal{L}^0 = \mathcal{L}; C^0 = \{\emptyset\}; k = 0;$
2: $E = \{\emptyset\};$
3: while $C^k \neq \mathcal{F}$ do
4: $\quad s_l^k = (c_l - \sum_{\forall f \in C^k \cap \mathcal{F}_l} r_f)/|\mathcal{F}_l \setminus C^k|, \forall l \in \mathcal{L}^k;$
5: $\quad u_l^k = min\{s_{l'}^k \mid \mathcal{F}_{l'} \cap \mathcal{F}_l \neq \{\emptyset\}, \forall l' \in \mathcal{L}^k\}, \forall l \in \mathcal{L}^k;$
6: $\quad$ for $l \in \mathcal{L}^k, s_l^k = u_l^k$ do
7: $\quad\quad r_f = s_l^k, \forall f \in \mathcal{F}_l \setminus C^k;$
8: $\quad\quad E = E \cup \{(l,f), \forall f \in \mathcal{F}_l \setminus C^k\};$
9: $\quad\quad E = E \cup \{(f,l'), \forall f \in \mathcal{F}_l \setminus C^k \text{ and } \forall l' \in \mathcal{L}_f \mid s_{l'}^k \neq u_{l'}^k\};$
10: $\quad\quad \mathcal{L}^k = \mathcal{L}^k \setminus \{l\};$
11: $\quad\quad C^k = C^k \cup \{f, \forall f \in \mathcal{F}_l\};$
12: $\quad$ end for
13: $\quad \mathcal{L}^{k+1} = \mathcal{L}^k; C^{k+1} = C^k;$
14: $\quad k = k + 1;$
15: end while
16: $V = \mathcal{L} \setminus \mathcal{L}^k \cup \mathcal{F}; s_l = s_l^k, \forall l \in \mathcal{B};$
17: $\mathcal{G} = (V, E);$
18: return $(\mathcal{G}, \{s_l, \forall l \in \mathcal{L}\}, \{r_f, \forall f \in \mathcal{F}\});$

*FIG. 2A*

Algorithm 1B GradientGraph($\mathcal{N} = \langle \mathcal{L}, \mathcal{F}, \{c_l, \forall l \in \mathcal{L}\} \rangle$)

1: $\mathcal{V} = \emptyset, E = \emptyset; r_f = \infty, \forall f \in \mathcal{F};$
2: for $l \in \mathcal{L}$ do
3:    $a_l = c_l;$     # available capacity
4:    $s_l = a_l / |\mathcal{F}_l|;$     # fair share
5:    MinHeapAdd(key = $s_l$, value = $l$);
6: end for
7: while $\mathcal{F} \not\subseteq \mathcal{V}$ do
8:    $l$ = MinHeapPop();
9:    for $f \in \mathcal{F}_l$ such that $r_f \geq s_l$ do
10:      $E = E \cup \{(l,f),(f,l)\};$
11:      if $f \notin \mathcal{V}$ then
12:         $r_f = s_l;$
13:         $\mathcal{V} = \mathcal{V} \cup \{f\};$
14:         for $l' \in \mathcal{L}_f$ such that $r_f < s_{l'}$ do
15:            $E = E \cup \{(f,l')\};$
16:            $a_{l'} = a_{l'} - s_l;$
17:            $s_{l'} = a_{l'} / |\mathcal{F}_{l'} \setminus \mathcal{V}|;$
18:            MinHeapUpdateKey(value = $l'$, newKey = $s_{l'}$);
19:         end for
20:      end if
21:    end for
22:    $\mathcal{V} = \mathcal{V} \cup \{l\};$
23: end while
24: return $(\mathcal{G} = (V, E), \{s_l, \forall l \in \mathcal{L}\}, \{r_f, \forall f \in \mathcal{F}\});$

*FIG. 2B*

Algorithm 2 ForwardGrad($\mathcal{L}, \mathcal{F}, \mathcal{G}, x \in \mathcal{L} \cup \mathcal{F}, \Delta x \in \{\pm 1\}$)

1: $\Delta c_l = 0 \quad \forall l \in \mathcal{L}$
2: $\Delta r_f = 0 \quad \forall f \in \mathcal{F}$ # Drift of flow $f$
3: $\Delta s_l = 0 \quad \forall l \in \mathcal{L}$ # Drift of link $l$
4: if $x \in \mathcal{F}$ then
5: $\quad \Delta u_x = \Delta x$
6: $\quad$ MinHeapAdd(key = $(u_x, \Delta u_x)$, value = $x$)
7: else if $x \in \mathcal{L}$ then
8: $\quad \Delta c_x = \Delta x$
9: $\quad \Delta s_x = \Delta c_x / |\text{successors}(x, \mathcal{G})|$
10: $\quad$ MinHeapAdd(key = $(s_x, \Delta s_x)$, value = $x$)
11: end if
12: $V = \emptyset$ # the set of previously visited nodes
13: repeat
14: $\quad$ repeat
15: $\quad\quad y = $ MinHeapPop(); # Get the next unvisited node
16: $\quad$ until $y \notin \emptyset$
17: $\quad V = V \cup \{y\}$
18: $\quad$ if ($y \in \mathcal{L}$ and $\Delta s_y = 0$) or ($y \in \mathcal{F}$ and $\Delta u_y = 0$) then
19: $\quad\quad$ Continue
20: $\quad$ end if
21: $\quad$ for $y' \in $ successors$(y, \mathcal{G}) \setminus V$ do
22: $\quad\quad$ if $y' \in \mathcal{F}$ then
23: $\quad\quad\quad \Delta r_{y'} = \min_{l \in \text{predecessors}(y', \mathcal{G})} \Delta s_l$ # Flow equation invariant
24: $\quad\quad\quad$ MinHeapAdd(key = $(r_{y'}, \Delta r_{y'})$, value = $y'$)
25: $\quad\quad$ else if $y' \in \mathcal{L}$ then
26: $\quad\quad\quad \Delta c_{y'} = \Delta c_{y'} - \Delta u_y$
27: $\quad\quad\quad \Delta s_{y'} = \Delta c_{y'} / |\text{successors}(y', \mathcal{G}) \setminus V|$ # Link equation invariant
28: $\quad\quad\quad$ MinHeapAdd(key = $(s_{y'}, \Delta s_{y'})$, value = $y'$)
29: $\quad\quad$ end if
30: $\quad$ end for
31: until MinHeapEmpty()
32: return ($\Delta s_l \quad \forall l \in \mathcal{L}, \quad \Delta r_f \quad \forall f \in \mathcal{F}$)

*FIG. 2C*

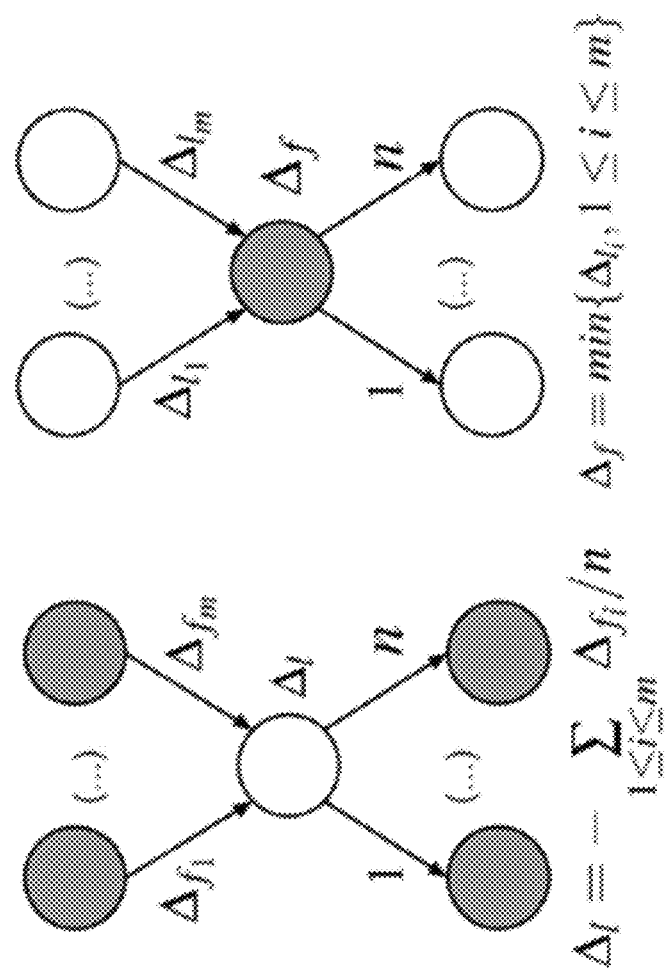
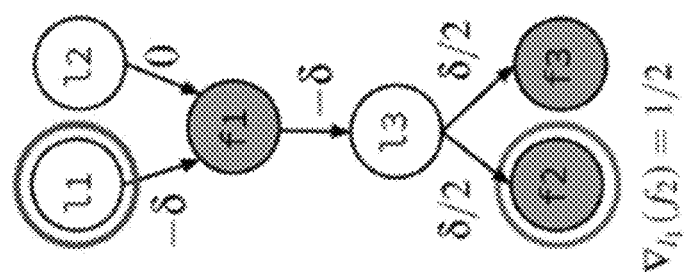
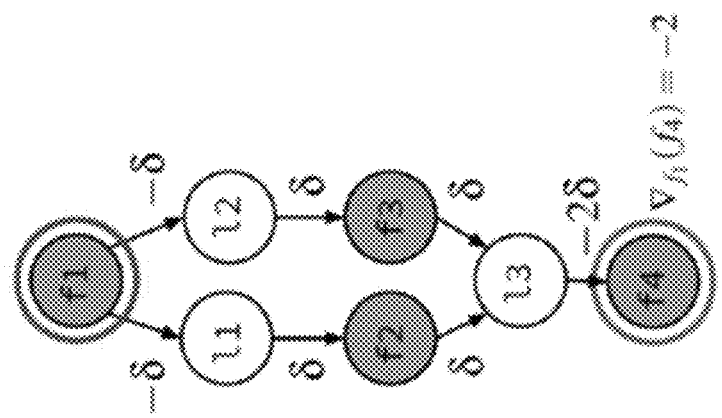
FIG. 3A    FIG. 3B    FIG. 3C    FIG. 3D

SYSTEMS AND METHODS FOR USING BOTTLENECK STRUCTURES TO IMPROVE PERFORMANCE OF MACHINE LEARNING-BASED MODELING

FIELD OF THE DISCLOSURE

Aspects of the present disclosure generally relate to systems and methods for using bottleneck structures to improve the performance of machine learning-based modeling.

BACKGROUND

A neural network is a specific type of operator graph. Operator graphs, such as deep neural network (DNN) structures have been increasing in size. The increase in size may improve accuracy of the neural networks and/or enable the neural networks to address a growing number of tasks. Larger neural networks operate more efficiently on larger processing systems with larger amounts of memory. On the other hand, demand has increased for the ability to efficiently run neural networks in small hardware devices, such as mobile phones, automobiles, or internet-of-things (IOT) devices.

Despite the computational power of neural networks, it is challenging to model complex systems such as compute and communications systems. Thus, it is also challenging to apply neural networks to such complex systems.

SUMMARY

The present disclosure is set forth in the independent claims, respectively. Some aspects of the disclosure are described in the dependent claims.

In an aspect of the present disclosure, a processor-implemented method is provided. The processor-implemented method includes receiving information associated with a communications system including multiple elements. Each of the multiple elements is configured to communicate with other elements of the communications system. The processor-implemented method also includes generating a bottleneck structure based on the information associated with the communications system. Additionally, the processor-implemented method includes processing, by an artificial neural network (ANN), the bottleneck structure and the information associated with the communications system to generate a digital model corresponding to the communications system.

In an aspect of the present disclosure, an apparatus is provided. The apparatus includes a memory and one or more processors coupled to the memory. The processor(s) are configured to receive information associated with a communications system including multiple elements. Each of the multiple elements is configured to communicate with other elements of the communications system. The processor(s) are also configured to generate a bottleneck structure based on the information associated with the communications system. In addition, the processor(s) are configured to process, by an artificial neural network (ANN), the bottleneck structure and the information associated with the communications system to generate a digital model corresponding to the communications system.

In an aspect of the present disclosure, an apparatus is provided. The apparatus includes means for receiving information associated with a communications system including multiple elements. Each of the multiple elements is configured to communicate with other elements of the communications system. The apparatus also includes means for generating a bottleneck structure based on the information associated with the communications system. Additionally, the apparatus includes means for processing, by an artificial neural network (ANN), the bottleneck structure and the information associated with the communications system to generate a digital model corresponding to the communications system.

In an aspect of the present disclosure, a non-transitory computer readable medium is provided. The computer readable medium has encoded thereon program code. The program code is executed by a processor and includes code to receive information associated with a communications system including multiple elements. Each of the multiple elements is configured to communicate with other elements of the communications system. The program code also includes code to generate a bottleneck structure based on the information associated with the communications system. Additionally, the program code includes code to process, by an artificial neural network (ANN), the bottleneck structure and the information associated with the communications system to generate a digital model corresponding to the communications system.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

The present disclosure will become more apparent in view of the attached drawings and accompanying detailed description. The aspects depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIGS. 2A and 2B show different aspects of a procedure to construct a bottleneck structure used in analysis and manipulation of a network.

FIG. 2C shows different aspects of a procedure to compute link and flow gradients using a gradient graph, according to various aspects of the present disclosure.

FIGS. 3A and 3B illustrate analysis of bottleneck links and bottleneck flows, according to various aspects, according to various aspects of the present disclosure.

FIGS. 3C and 3D illustrate computation of gradients for the bottleneck links and flows depicted in FIGS. 3A and 3B, according to various aspects of the present disclosure.

DETAILED DESCRIPTION

Figure 1:
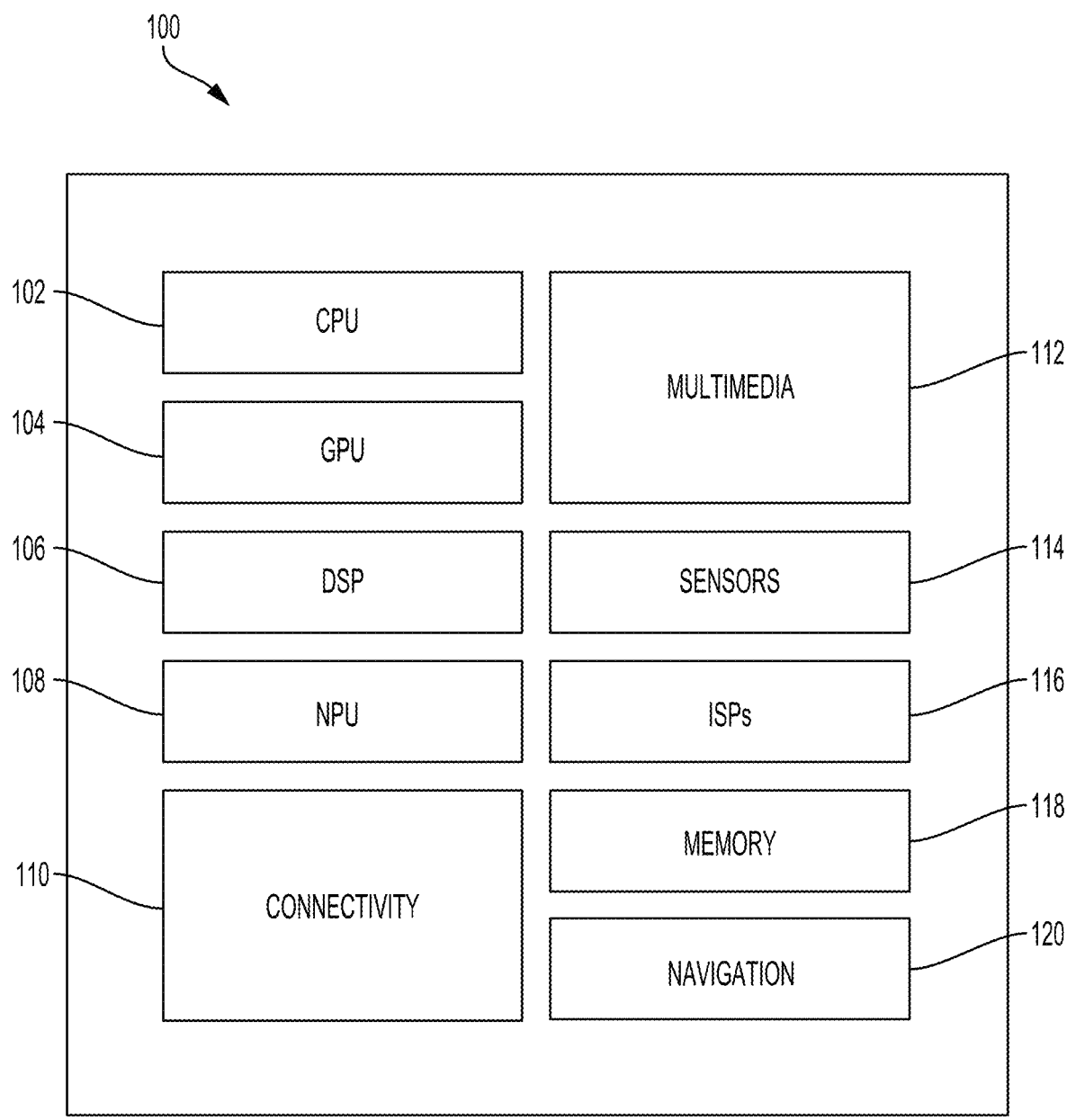
FIG. 1 illustrates an example implementation of a neural network using a system-on-a-chip (SOC), including a general-purpose processor in accordance with various aspects of the present disclosure.

A neural network is a particular type of operator graph. Although the following description is primarily with respect to neural networks, the disclosure is not so limited. Any type of operator graph is contemplated.

In many state-of-the-art communication and compute system optimization problems, it is crucial to provide a logical model of the system to compute optimized configurations that can yield improved application performance. For instance, in the area of communications systems, attempts have been made to develop reference architectures to define a digital twin. The digital twin may be considered a logical copy of a communications network (e.g., 5G new radio, 6G, or edge cloud) that may be used by an application to estimate key performance metrics of the communications system and to make optimized informed decisions. For instance, optimization use cases may include path selection and application rate encoding, as well as the design of self-managed, autonomic edge-computing systems that can operate without human intervention. As another example, in the area of hardware-aware network architecture search (NAS) for artificial intelligence (AI), compiler tools may model compute and communications systems where the software AI application is to be executed, with the objective to optimize the mapping of a neural network and the scheduling of computational tasks onto the given hardware architecture.

Bottleneck structures are computational graphs that characterize the state of a communications network allowing human operators and machines to quickly compute network derivatives. These derivatives are building blocks that enable the optimization of the system in a wide variety of problems including routing, flow scheduling, task scheduling, neural network parallelization, capacity planning, system design, or resilience analysis, among many others. The theory of a bottleneck structure and its processes will be referred to as GradientGraph technology throughout this specification.

While bottleneck structures may provide a good first-order mathematical model approximation of a system, the underlying system may expose highly complex dynamics that are difficult to capture with a mathematical model. For instance, in a 5G network, application performance depends on complex routing and congestion control algorithms run by a transmission control protocol/Internet protocol (TCP/IP) stack. Similarly, in a multi-core AI processor architecture, application performance may, for example, depend on complex interactions between the various processors (e.g., central processing unit (CPU), graphics processing unit (GPU), and/or neural processing unit (NPU)), memory, data bus architecture, and network-on-chip architecture.

Accordingly, aspects of the present disclosure are directed to techniques that leverage latent information provided by bottleneck structures to increase the estimated performance of a neural network. In turn, the estimated performance may then be applied to improve the accuracy of the bottleneck structure model itself.

In accordance with aspects of the present disclosure, the disclosed techniques may comprise a procedure for improving the estimates generated by a model of a compute and communications system involving: generating bottleneck structures using a GradientGraph (GradientGraph refers to a computational framework that is capable of computing such objects very fast), leveraging the fast metric computations of the bottleneck structures, using the computed metrics as input for a graph neural network (GNN) model, and leveraging the latent information provided by the bottleneck structure to improve the performance of the GNN. The techniques of the present disclosure may also reduce training time and inference time of a compute and communications system using artificial neural networks. These improvements lead to increased accuracy and power efficiency.

FIG. 1 illustrates an example implementation of a system-on-a-chip (SOC) 100, which may include a central processing unit (CPU) 102 or a multi-core CPU configured for generating a digital model of a compute communications system using bottleneck structures. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive information associated with a communications system including multiple elements. Each of the multiple elements is configured to communicate with other elements of the communications system. The general-purpose processor

102 may also include code to generate a bottleneck structure based on the information associated with the communications system. The general-purpose processor 102 may further include code to process, by an artificial neural network (ANN), the bottleneck structure and the information associated with the communications system to generate a digital model corresponding to the communications system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Aspects of the present disclosure employ bottleneck structures (the technique is referred to as GradientGraph in this specification) to efficiently and accurately model complex systems such as compute and communications systems. Employing bottleneck structures allows the metaheuristic process to more accurately estimate the cost function being minimized, leading to improved solutions. In addition, the GradientGraph technique computes gradients and helps the metaheuristic make biased randomized configuration selections, leading to an improved stochastic gradient descent process.

A more detailed discussion of the GradientGraph technique is now provided. Bottleneck links in congestion-controlled networks do not operate as independent resources. Rather, bottleneck links may operate according to a bottleneck structure that may reveal the interactions of bottleneck links, and system-wide ripple effects caused by perturbations in the congestion-controlled network. Techniques using the bottleneck structure, such as the Gradient-Graph method described, can address a gap in the analysis performed by the conventional techniques, and may provide an efficient methodology to estimate newtork flow throughput.

A technique for expressing bottleneck structures may take into account the system-wide properties of a network, including its topology, the routing and the interactions between flows, for example, and can numerically estimate flow throughput.

The bottleneck structure of a network may be represented qualitatively, via a bottleneck precedence graph (BPG), for instance. A BPG may be considered a structure that organizes the relationships among bottleneck links. The techniques disclosed feature an enhanced analysis of a bottleneck structure that takes into account the relationships among flows and links, rather than just links, and thus may provide a more comprehensive view of the network or a system modeled as a network. As such, aspects of the present disclosure may provide a framework to quantify the interactions among flows and links, resulting in a new class of algorithms to optimize network performance.

Research on the problem of congestion control for data networks is generally based on the principle that the performance of a flow is solely determined by the state of its bottleneck link. This view was presented in one of the earliest congestion control algorithms. This helped the Internet recover from congestion collapse in 1988, and this view persisted throughout the more than 30 years of research and development that followed, including Google's new bottleneck bandwidth and round-trip propagation time (BBR) algorithm. While it is generally true that a flow's performance is limited by the state of its bottleneck link, a deeper view of network behavior is provided by describing how bottlenecks interact with each other through a latent structure-called the bottleneck structure—that depends on the topological, routing, and flow control properties of the network. This latent structure explains how the performance of one bottleneck can affect other bottlenecks and provides a framework to understand how perturbations in the capacity of a link or the rate of a flow propagate through a network, affecting other links and flows.

A related structure is described in U.S. Pat. No. 11,298,984, (the "'984 patent") titled "Systems and Methods for Quality of Service (QOS) Based Management of Bottlenecks and Flows in Networks," filed on Sep. 24, 2019, which is incorporated herein by reference in its entirety. The '984 patent generally describes qualitative properties of the bottleneck precedence graph (BPG), a structure that analyzes the relationships among links.

A quantitative theory of bottleneck structures (QTBS), a mathematical framework that yields a set of polynomial time and/or memory-efficient algorithms for quantifying the ripple effects of perturbations in a network is presented. Perturbations can either be unintentional (such as the effect of a link failure or the sudden arrival of a large flow in a network) or intentional (such as the upgrade of a network link to a higher capacity or the modification of a route with the goal of optimizing performance). With QTBS, a network operator can quantify the effect of such perturbations and use this information to optimize network performance.

The techniques described herein are generally applicable to networks that transport commodity flows and also to systems that can be modeled as networks. In addition to communications networks, examples include (but are not limited to) vehicle networks, energy networks, fluidic networks, and biological networks. For example, the problem of vehicle networks generally involves identifying optimized designs of the road system that allows for a maximal number of vehicles that can circulate through the network without congesting it, or similarly, minimizing the level of congestion for a given number of circulating vehicles. In this case, vehicles are analogous to packets in a data network, while flows correspond to the set of vehicles going from location A to location B at a given time that follow the same path.

The capacity planning techniques described below can be used to analyze the need to construct a road to mitigate congestion hotspots, compute the right amount of capacity needed for each road segment, and to infer the projected effect on the overall performance of the road system. Similarly, the routing techniques described below can be used to suggest to drivers to choose alternative paths to their destination that would yield higher throughput or, equivalently, lower their destination arrival time.

The problem of energy networks generally includes transporting energy from the locations where energy is generated to the locations where it is consumed. For instance, energy can be in the form of electricity carried via the electrical grid. Other examples include fluidic networks, which can carry crude oil, natural gas, water, etc., or biological networks that may carry water, nutrients, etc.

Biological networks, through evolution, may tend to organize themselves in optimized structures that maximize their performance (in terms of transporting nutrients) and/or minimize the transportation costs. For instance, a tree transports sap from the root to its branches and in both directions. The sap transported from the root to its branches and leaves is called xylem, which carries energy and nutrients found from the soil where the tree is planted. The sap transported from the leaves and branches to the root is called phloem, which also carries important nutrients obtained from the biochemical process of photosynthesis performed in the cells of the leaves. In both networks (upward and downward), it is likely that the network transporting the sap performs optimally in terms of minimizing the amount of energy required to transport a given amount of sap. Such optimized designs can be generated for other types of networks, using the bottleneck structures, as discussed below. Biological networks can themselves be optimized based on such analysis.

In their simplest form, networks are systems that can be modeled using two kinds of elements: links, which offer communication resources with a limited capacity; and flows, which make use of such communication resources. The definition of a network may be formalized as follows:

A tuple $\mathcal{N} = ( \mathcal{L}, \mathcal{F}, \{c_l, \forall l \in \mathcal{L}\} )$ is a network in which $\mathcal{L}$ is a set of links of the form $\{l_1, l_2, \ldots, l_{|\mathcal{L}|}\}$, $\mathcal{F}$ is a set of flows of the form $\{f_1, f_2, \ldots, f_{|\mathcal{F}|}\}$, and $c_l$ is the capacity of link l, for all $l \in \mathcal{L}$.

Each flow f traverses a subset of links $\mathcal{L}_f \subset \mathcal{L}$ and, similarly, each link l is traversed by a subset of flows $\mathcal{F}_l \subset \mathcal{F}$, where $f = \mathcal{L}_f$ and $l = \mathcal{F}_l$. That is, a flow may be considered the list of links that it traverses, and a link may be considered the list of flows that traverse it. Additionally, each flow f may transmit data at a rate $r_f$ and the capacity constraint $\Sigma_{\forall f \in l} r_f \leq c_l$ holds for all $l \in \mathcal{L}$.

A concept upon which the bottleneck framework resides is the notion of a bottleneck link. Intuitively, a link in a network is a bottleneck if its capacity is fully utilized.

Bottleneck link. Given a network $\mathcal{N} = ( \mathcal{L}, \mathcal{F}, \{c_l, \forall l \in \})$ $\mathcal{L}$, where each flow $f \in \mathcal{F}$ transmits data at a rate $r_f$ determined by a congestion control algorithm (e.g., TCP's algorithm). The flow f is bottlenecked at link l—equivalently, that link l is a bottleneck to flow f—if and only if the flow f traverses link l, and $$\frac{\partial r_f}{\partial c_l^-} \neq 0,$$

where the $\partial r_f / \partial c_l^-$ denotes the left derivative. That is, the transmission rate of flow f changes upon small changes of link l's capacity. It is noted that, in some aspects, a flow can have multiple bottleneck links. In this case, decreasing the capacity of only one bottleneck may affect the rate of the flow, while increasing its capacity may not; thus, the (two-sided) derivative may not exist.

The definition of bottleneck may generalize some classic definitions found in literature, while differing from them in that it focuses on the notion of perturbation, mathematically expressed as a derivative of a flow rate with respect to the capacity of a link, $\partial r_f / \partial c_l$. The character of the bottleneck definition in various aspects described may make the disclosed bottleneck framework applicable to specific rate allocation assignments (e.g., max-min, proportional fairness, etc.), specific congestion control algorithms (e.g., BBR, Cubic, Reno, etc.), as well as any class of congestion control solutions, such as those available in state-of-the-art networks.

Fair share of a link. Given a network $\langle = \mathcal{N} \mathcal{L}, \mathcal{F}, \{c_l, \forall l \in \} \rangle \mathcal{L}$, the fair share $s_l$ of a link $l \in \mathcal{L}$ may be defined as the rate of the flows that are bottlenecked at such link. The flows bottlenecked at a link may all have the same rate that may be the same as the fair share of the link. The concept of link fair share may be a dual to the concept of flow rate. That is, the mathematical properties that are applicable to the rate of a flow, may also be applicable to the fair share of a link.

An objective of the present disclosure is to derive a mathematical framework for quantifying the effects that perturbations on links and flows exert on each other. Accordingly, a gradient graph may be defined as a data structure such as a digraph in which:

1. For every bottleneck link and for every flow, there exists a vertex.
2. For every flow f:
   (a) If f is bottlenecked at link l, then there exists a directed edge from l to f;

(b) If f is not bottlenecked at link l but it traverses it, then there exists a directed edge from f to l.

Expressed differently, the gradient graph may comprise a digraph such that:

1. For every bottleneck link and for every flow, there exists a vertex.
2. For every flow f:
   (a) If f is bottlenecked at link l, then there exists a directed edge from l to f;
   (b) If f traverses link l, then there exists a directed edge from f to l.

By way of notation, the terms gradient graph and bottleneck structure as described may be considered synonymous. That is, a gradient graph may describe how perturbations on links and flows propagate through a network. For instance, a directed edge from a link l to a flow f may indicate that flow f is bottlenecked at link l. A directed edge from a flow f to a link l may indicate that flow f traverses but is not bottlenecked at link l, and a bidirectional edge from a flow f to a link l may indicate that flow f traverses (and is bottlenecked at) link l.

The definition of bottleneck links may indicate that a perturbation in the capacity of link l may cause a change on the transmission rate of flow $$f, \frac{\partial r_f}{\partial c_l} \neq 0.$$

A change in the value of $r_f$, in turn, may generate a perturbation that propagates to all the other links traversed by flow f, following the direction of those edges departing from flow f and arriving at such links. The process of (1) inducing a perturbation in a vertex in a graph (either in a link or a flow vertex) followed by (2) propagations in the departing edges of the vertex, may produce a ripple effect in the bottleneck structure, terminating at leaves of the gradient graph.

Consider a pair of links or flows (x, y) in the network where x, y ∈ $\mathcal{L} \cup \mathcal{F}$. A perturbation in the capacity $c_x$ (for x ∈ $\mathcal{L}$) or transmission rate $r_x$ (for x ∈ $\mathcal{F}$) of x may affect the fair share $s_y$ (for y ∈ $\mathcal{L}$) or transmission rate $r_y$ (for y ∈ $\mathcal{F}$) of y if and only if there exists a directed path from x to y in the gradient graph. Accordingly, the propagation of a perturbation in a bottleneck link may be characterized as 1. Change in link capacity:
   (a) A perturbation in a link l induced by a change on the link l capacity $c_l$ may propagate to another link l' affecting the fair share $s_{l'}$ of link l' if and only if l' is a descendant of l in the gradient graph.
   (b) A perturbation in a link l induced by a change on the link l capacity cy may propagate to a flow f affecting its transmission rate $r_f$ if, and in some aspects, only if f is a descendant of l in the gradient graph.
2. Given a flow f that is bottlenecked at link l, the following characterizes the propagation of a perturbation in a flow:
   (a) A perturbation in the flow f induced by a change on a transmission rate $r_f$ of the flow f may propagate to a link l' affecting the fair share $s_{l'}$ of the link l' if, and in some aspects, only if the link l' is a descendant of the link l in the gradient graph.
   (b) A perturbation in flow f induced by a change on the transmission rate $r_f$ of the flow f may propagate to a flow f' affecting the transmission rate $r_{f'}$ of the flow f' if, and in some aspects, only if the flow f' is a descendant of the link l in the gradient graph.

The gradient graph of the network may describe how perturbations in link capacities and flow transmission rates propagate through the network. For instance, a flow f that is bottlenecked at link l, may indicate that a perturbation in the capacity of link l may cause a change in the transmission rate of flow f, $$\frac{\partial r_f}{\partial c_l} \neq 0.$$

This may be reflected in the gradient graph by the presence of a directed edge from the link l to the flow f. A change in the value of the transmission rate $r_f$, may, in turn, affect all the other links traversed by the flow f. This may be reflected by the directed edges from the flow f to the links that flow f traverses. The process of (1) inducing a perturbation in a vertex (e.g., a link vertex or a flow vertex) followed by (2) propagating the effects of the perturbation along the departing edges of the vertex may produce a ripple effect in the bottleneck structure. Accordingly, regions of influence of the network may be defined.

Regions of influence in a data network. The region of influence of a link or flow x, denoted as $\hat{\mathcal{R}}(x)$, may be defined as the set of links and flows y that are reachable from x in the gradient graph.

In the case of the region of influence of a link l, the other links and flows may be affected by a perturbation in the capacity $c_l$ of link l. Similarly, in the case of the region of influence of a flow f, the set of links and other flows are affected by a perturbation in the transmission rate $r_f$ of flow f.

Additionally, the region of influence of a link (or a flow) corresponds to its descendants in the gradient graph. Thus, the region of influence may be an important concept in network performance analysis and optimization because the region of influence describes parts of the network that are affected by perturbations in the performance of a link or a flow.

FIG. 2A is a diagram illustrating an example procedure for computing a gradient graph, in accordance with aspects of the present disclosure. Referring the FIG. 2A, the procedure works as follows. In line 4, a fair share estimate of each link is computed. Lines 5 and 6 select all links that currently have the smallest fair share among those links with which they share a flow. For each of these links: (1) all the flows remaining in the network that traverse them are assigned the fair share of the link (line 7), removed from the network (line 10) and put into the set of flows that have converged to their theoretical transmission rate $\mathcal{C}^k$ (line 11); (2) the link itself is also removed (line 10); and (3) directed edges are added to the gradient graph that go from the link to all the flows bottlenecked at such link (line 8) and from each of these flows to the rest of the links that the flows traverse (line 9). This iterative process may be repeated until all flows have converged to their theoretical rate (line 3). The procedure returns the gradient graph $\mathcal{G}$, the fair share of each link {$s_l$, ∀l ∈ $\mathcal{L}$} and the rate of each flow {$r_f$, ∀f ∈ $\mathcal{F}$}.

The time complexity of the GradientGraph procedure shown in FIG. 2A may be given by O(H·|$\mathcal{L}$|²+|$\mathcal{L}$|·|$\mathcal{F}$|), where H is the maximum number of links traversed by any flow.

FIG. 2B shows another aspect of GradientGraph. In this aspect, the procedure may begin with crude estimates of the fair share rates of the links and may be iteratively refined until all the capacity in the network has been allocated and the rate of each flow reaches its final value. In the process, the gradient graph is constructed level by level. The procedure starts by initializing the available capacity of each link (line 3), estimating its fair share (line 4), and adding all links to a min-heap by taking their fair share value as the key (line 5). At each iteration, the procedure selects the unresolved link with the lowest fair share value from the min-heap (line 8).

Once the link is selected, all unresolved flows remaining in the network that traverse it are resolved. That is, the rates are set to the fair share of the link (line 12) and added to the set of vertices V of the gradient graph (line 13). In addition, directed edges are added in the gradient graph between the link and all the flows bottlenecked at the link (line 10) and from each of these flows to the other links that they traverse (line 15). Lines 16-17-18 update the available capacity of the link, its fair share, and the position of the link in the min-heap according to the new fair share. Finally, the link itself is also added as a vertex in the gradient graph (line 22). This iterative process may be repeated until all flows have been added as vertices in the gradient graph (line 7). The procedure returns the gradient graph G, the fair share of each link $\{s_l, \forall l \in \mathcal{L}\}$ and the rate of each flow $\{r_f, \forall f \in \mathcal{F}\}$.

The time complexity of running GradientGraph( ) may be given by O(|L| log [L]·H), where H is the maximum number of flows that traverse a single link.

The GradientGraph is memory efficient, as well. In particular, various aspects of the GradientGraph include a respective vertex for each link and a respective vertex for each flow. As such, the number of vertices in a GradientGraph is $O(|\mathcal{L}|+|\mathcal{F}|)$. The edges in the graph from a link vertex to one or more flow vertices do not include, however, an edge to each and every flow vertex where that flow vertex represents a flow traversing the link corresponding to the link vertex. Rather, edges exist from a link vertex to a flow vertex only if, as described above, a flow corresponding to that flow vertex is bottlenecked at the link corresponding to the link vertex. This minimizes the total number of edges in various aspects and implementations of GradientGraph.

Since the memory required to construct a GradientGraph is a function of (e.g., proportional to the total number of vertices and the total number of edges), the identification of the bottleneck structure facilitates efficient memory allocation in various aspects. Specifically, in some cases, the memory to be allocated can be a function of the total number of link vertices to flow vertices edges, denoted ($|E_b^{l \to f}|$) where $|E_b^{l \to f}|$ is a sum of the number of bottlenecked flows at each link. The required memory may be proportional to $O(|\mathcal{L}|+|\mathcal{F}|+[E])$, where the set {E} includes the set of edges from flow vertices to link vertices, denoted $\{E^{l \to f}\}$ and the set of edges from link vertices to flow vertices corresponding to bottlenecked flows, denoted $\{E^{l \to f}\}$. In some cases, the total number of flows bottlenecked at a link l is less than the total number of flows traversing the link l, minimizing the number of edges $|E^{l \to f}|$.

Since, for one or more links, all flows traversing such links may not be bottlenecked at those respective links, the total number of link-to-flow edges (or the total number of bidirectional link-to-flow edges) that are required may be minimized compared to a network graph structure having, for each link, and edge from a corresponding link vertex to vertices corresponding to all flows traversing the link. This can facilitate a memory efficient storage of the gradient graph. Thus, the derivation of the bottleneck structure can minimize the memory required to store and manipulate such a structure, in various aspects.

The ripple effects produced by perturbations in a network may also be quantified. Because networks include links and flows, possible causes of perturbations may include: (1) those originating from changes in the capacity of a link and (2) those originating from changes in the rate of a flow. When such changes occur, a congestion control algorithm may adjust the allocation of bandwidth to the flows so as to maintain two objectives: (1) maximizing network utilization while (2) ensuring fairness among competing flows. The congestion control algorithm acts like a function mapping network conditions (including its topology, link capacities, and flow paths) to rate allocations. Large changes in any of these inputs can have complicated ripple effects on the flow rates, but for sufficiently small changes, the bandwidth allocation function is linear. Technically, it is piecewise linear, like the absolute value function, so picking a linear function that locally approximates it requires knowing the direction of the change. This local linearity property is used to form the concept of link and flow gradients:

The gradient of a link $l^* \in \mathcal{L}$ with respect to some other link $l \in \mathcal{L}$, denoted with $\nabla_{l^*}(l)$, as $$\nabla_{l^*}(l) = \frac{\partial s_l}{\partial c_{l^*}}.$$

The gradient of a link $l^* \in \mathcal{L}$ with respect to some flow $f \in \mathcal{F}$, denoted with $\nabla_{l^*}(f)$, as $$\nabla_{l^*}(f) = \frac{\partial r_f}{\partial c_{l^*}}.$$

The gradient of a flow $f^* \in \mathcal{F}$ with respect to some link $l \in \mathcal{L}$, denoted with $\nabla_{f^*}(l)$, as $$\nabla_{f^*}(l) = \frac{\partial s_l}{\partial r_{f^*}}.$$

The gradient of a flow $f^* \in \mathcal{F}$ with respect to some other flow $f \in \mathcal{F}$, denoted with $\nabla_{f^*}(f)$, as $$\nabla_{f^*}(f) = \frac{\partial r_f}{\partial r_{f^*}}.$$

The gradient of a link measures the impact that a fluctuation on the capacity of a link has on other links or flows in the network. In real networks, this corresponds to the scenario of physically upgrading a link or, in programmable networks, logically modifying the capacity of a virtual link. Thus, link gradients can generally be used to resolve network design and capacity planning problems. Similarly, the gradient of a flow measures the impact that a fluctuation on its rate has on a link or another flow. For instance, this scenario corresponds to the case of traffic shaping a flow to alter its transmission rate or changing the route of a flow—which can be seen as dropping the rate of that flow down to zero and adding a new flow on a different path. Thus, flow gradients can generally be used to resolve traffic engineering problems, for example.

Given the network $\mathcal{N} = \langle \mathcal{L}, \mathcal{F}, \{c_l, \forall l \in \mathcal{L}\} \rangle$ and the output of GradientGraph($\mathcal{N}$), let $\delta$ be an infinitesimally small perturbation performed on the capacity of a link $l^* \in \mathcal{L}$ (equivalently, on the rate of a flow $f^* \in \mathcal{F}$). After the perturbation $\delta$ has propagated through the network, the fair share of any link $l \in \mathcal{L}$ may be expressed as $s_l + \Delta_l$ and the rate of any flow $f \in \mathcal{F}$ may be expressed as $r_f + \Delta_f$, where $\Delta_l$ and $\Delta_f$ are the drift of a link $l$ and a flow $f$, respectively, associated with perturbation $\delta$.

The drift may correspond to a change of performance experienced by a link or a flow when another link or flow is perturbed. FIG. 2C shows different aspects of a procedure to compute link and flow gradients using a gradient graph, according to various aspects of the present disclosure. With reference to FIG. 2C, an algorithm called ForwardGrad( ) for calculating link and flow gradients is presented. The ForwardGrad( ) algorithm may take a set of links and flows, the gradient graph of the corresponding network, a link or flow x with respect to which to compute the gradients, and a direction $\Delta x$ of the perturbation. The ForwardGrad( ) algorithm may output the gradients of links and flows in the network with respect to x. The ForwardGrad( ) algorithm is related to forward mode automatic differentiation ("Forward Prop"). Forward Prop is an algorithm that uses directed acyclic graphs to represent complicated mathematical functions as compositions of simpler functions, whose derivatives can be composed by repeatedly applying the chain rule. In the case of congestion control, a closed-form mathematical formula that relates network conditions (the inputs) to the flow rates and fair share values (the outputs) is not available and, as such, Forward Prop cannot be used in this context. However, the gradient graph may be used to break down and optimize this function.

For all $l \in \mathcal{L}$. $\Delta_l$ may represent the change in the fair share rate of link $l$. For all $f \in \mathcal{F}$. $\Delta_f$ may represent the change in the rate of flow $f$. These variables (e.g., $\Delta_l$ and $\Delta_f$) may be considered the "drifts" caused by a perturbation. Before the perturbation, $\Delta_l = \Delta_f = 0$ for all links and flows. To begin the algorithm, an infinitesimally small perturbation is made in the independent variable (e.g., in the "denominator" of the derivative) that can be positive or negative. If the independent variable x is a flow f, the $\Delta_f = \delta$ (line 2). If the independent variable x is a link $l$, and $S_l$ is the set of direct successors of node $l$ in the gradient graph, then $\Delta_l = \delta S_l$ (line 3). This is done because, by definition of the gradient graph, $S_l$ is the number of flows bottlenecked at $l$ and the change in $l$'s capacity is distributed evenly among these flows. To determine how this perturbation propagates to the rest of the network, all directed paths ae followed from that vertex and the drifts are updated according to the following two invariants:

Gradient graph invariants. Given the network $\mathcal{N} = \langle \mathcal{L}, \mathcal{F}, \{ \ , \{c_l, \forall l \in\} \ \} \mathcal{L}$ and its gradient graph $\mathcal{G}$, an infinitesimally small perturbation $\delta$ may be performed on the capacity of a link $l^* \in \mathcal{L}$ (equivalently, on the rate of a flow $f^* \in \mathcal{F}$). The drifts $\Delta_l$ and $\Delta_f$ are caused on a link $l \in \mathcal{L}$ and a flow $f \in \mathcal{F}$, respectively, by such a perturbation. The perturbation may propagate according to the gradient graph $\mathcal{G}$ by starting on the link vertex $l^*$ (equivalently, on the flow vertext $f^*$) and following all possible directed paths that depart from the link vertex $l^*$, while maintaining the following invariants at each traversed vertex:

Invariant 1: Flow Equation. A flow's drift $\Delta_f$ equals the minimum drift of its bottleneck links. That is, $$\Delta_f = \min_{l \in P_f} \Delta_l,$$

where $P_f$ is the set or links visited directly before flow vertex f on a path from the starting vertex x (the predecessors in the graph).

Invariant 2: Link Equation. A link's drift $\Delta_l$ is the negative of the flow drifts entering its vertex, divided by the number of flow drifts leaving it. That is, $\Delta_l = -\Sigma_{f \in P_l} \Delta_f / |S_l|$, where $P_l$ is the set of flow vertices visited directly before link vertex $l$ and $S_l$ is the set of flow vertices visited directly after link vertex $l$ on a path from the starting vertex x.

The derivative of a given variable with respect to the independent variable that has been perturbed may be calculated by dividing its drift by $\delta$. In particular, the capacity of link $l$ may be the independent variable that has been perturbed and the rate of flow f may be the dependent variable in which to measure the effect of this perturbation. Then, $\partial r_f / \partial c_l = \Delta_f / \delta$.

Invariant 1 may ensure that the capacity limits are respected, and the network's resources are not wasted. Each flow uses exactly the amount of bandwidth allocated by its bottleneck link. As such, if the bottleneck's fair share changes, the flow's rate also changes. Invariant 1 may also ensure fairness, because each flow bottlenecked at a certain link experiences the same drift.

Invariant 2 may ensure that capacity is neither created nor destroyed through the process of propagating a perturbation, except at the link whose capacity was initially perturbed. If a link's predecessors are using less bandwidth than before, then the savings is redistributed evenly among the other flows that traverse the link.

The resulting network gradient graph after the perturbation has propagated may be represented by $\mathcal{G}'$. Then, if $\mathcal{G} = \mathcal{G}'$, the link and flow gradients may be computed as follows:

$$\nabla_{l^*}(l) = \frac{\partial s_l}{\partial c_{l^*}} = \frac{\Delta_l}{\delta}; \nabla_{l^*}(f) = \frac{\partial r_f}{\partial c_{l^*}} = \frac{\Delta_f}{\delta};$$

$$\nabla_{f^*}(l) = \frac{\partial s_l}{\partial r_{f^*}} = \frac{\Delta_l}{\delta}; \nabla_{f^*}(f) = \frac{\partial r_f}{\partial r_{f^*}} = \frac{\Delta_f}{\delta}.$$

This states that if the gradient graph does not change its structure upon a small perturbation (e.g., $\mathcal{G} = \mathcal{G}'$) and the two invariants are preserved, then such a perturbation can be measured directly from the graph. The first invariant is a capacity feasibility constraint, ensuring that a flow's drift is limited by its most constrained bottleneck. The second invariant ensures that (1) the sum of the drifts arriving to and departing from a link vertex are equal to zero and (2) the drifts departing from a link vertex are equally distributed. Intuitively, this is needed to preserve the congestion control algorithm's objective to maximize network utilization while ensuring fairness among all flows.

FIGS. 3A and 3B show a graphical interpretation of bottleneck link and flow equations. FIG. 3C illustrates a simple example to compute the bottleneck link gradient $\nabla_{l_1}(f_2)$. A perturbation is applied to link $l_1$ that decreases its capacity $c_{l_1}$ by an infinitesimally small amount $\delta$. Such a perturbation propagates to flow $f_1$ according to the flow equation ($\Delta_f$=min $\{\Delta_{l_i}, 1 \le i \le m\}$), resulting in a drift $\Delta_{f_1}$=−δ. The perturbation is further propagated down to link $l_3$. Applying the link equation $$\left(\Delta_l = -\frac{\Sigma_{1 \le i \le m} \Delta_{f_i}}{n}\right).$$

generates a drift on this link of $$\Delta_{l_3} = \frac{\delta}{2}.$$

Applying again the flow equation on $f_2$ yields the flow drift $$\Delta_{f_2} = \frac{\delta}{2}.$$

Thus, the gradient of mix $l_1$ with respect to flow $f_2$ is $$\nabla_{l_1}(f_2) = \frac{\Delta_{f_2}}{\delta} = \frac{1}{2}.$$

FIG. 3D illustrates a simple example of flow gradient computation which shows that for this bottleneck structure, the gradient of flow $f_1$ with respect to flow $f_4$ is $\nabla_{f_1}(f_4)$=−2.

It should be noted that it is feasible for a link or flow gradient to have a value larger than 1. Such gradients are of interest because they mean that an initial perturbation of one unit at some location of a network, generates a perturbation at another location of more than one unit. For instance, a gradient of the form $\nabla_{f^*}(f) > 1$ implies that reducing the rate of flow $f^*$ by one unit creates a perturbation that results in an increase on the rate of flow f by more than one unit, thus creating a multiplicative effect. Such gradients can be used to identify arbitrage situations—e.g., configurations of the network that increase the total flow of a network. Because of their relevance, the term power gradient may be used to refer to such effect:

Power gradient. Let $\mathcal{N} = \mathcal{L}, \mathcal{F}, \langle\ , \{c_l, \forall l \in \} \mathcal{L}\rangle$ be a network and let δ be an infinitesimally small perturbation performed on a flow or link $x \in \mathcal{L} \cup \mathcal{F}$, producing a drift $\Delta_y$, for all $y \in \mathcal{L} \cup \mathcal{F}$. If $\Delta_y > \delta$, equivalently $\nabla_x(y) > 1$, then $\nabla_x(y)$ is a power gradient. Each of the gradients in congestion-controlled networks may satisfy a property of boundedness:

Gradient bound. Let $\mathcal{N} = \langle \mathcal{L}, \mathcal{F}, \{c_l, \forall l \in \mathcal{L}\} \rangle$ be a network and let $\mathcal{G}$ be its gradient graph. Let δ be an infinitesimally small perturbation performed on a flow or link $x \in \mathcal{L} \cup \mathcal{F}$, producing a drift $\Delta_y$, for all $y \in \mathcal{L} \cup \mathcal{F}$. Then, $$\nabla_x(y) = \frac{\Delta_y}{\delta} \le d^{\frac{D(\mathcal{G})}{4}},$$

where D(X) is the diameter function of a graph X and d is the maximum indegree and outdegree of any vertex in the graph.

The concepts of link and flow gradients provide a methodology to measure the effect of perturbations on a network that are small enough (infinitesimally small) to avoid a structural change in the gradient graph. The concepts of leap and fold may enable generalization of the framework to measure perturbations of arbitrary sizes. Two simple and intuitive examples of such kind of perturbations may be found in real networks include: a link failure, which corresponds to the case its capacity goes down to zero; or the re-routing of a flow, which corresponds to the case its rate goes down to zero and a new flow is initiated.

If a perturbation in the network is significant enough to modify the structure of the gradient graph (e.g., $\mathcal{G} \ne \mathcal{G}'$), then the link and flow equations (FIGS. 3A and 3B) cannot be used to compute the gradients of such a perturbation. A technique that can be used to measure perturbations of arbitrary sizes by using the concepts of leap and fold is presented.

The overall network analysis and/or manipulation or control processes described herein begin with the collection of network information including flow information, link information, and topology. The flow information generally includes the identities of flow, the total count of flows, and the rates of the identified flows during a specified observation window, which can be a few minutes, a few hours, a few days, or longer. The link information includes the number of active links, their identities, and their designated and/or maximum capacities during the specified observation window. The network topology includes the network nodes and the links, typically direct links, interconnecting such nodes.

In the case of data networks, the nodes may be data centers and/or computing centers, the links include data links, whether cable, wireless, or satellite based, the flow rates may include number of bits, bytes, packets, etc., passing through the links, and link capacities may be expressed in terms of available or allotted bandwidth or bit rate. In the case of transportation networks, the nodes can be cities, locations within cities or a metropolitan area, airports, marine ports, etc., the links can be roadways, railways, subway routes, airline routes, marine routes, etc., the flow rates and link capacities can be expressed in terms of the number of passengers or travelers, the number of vehicles, etc.

In the case of energy networks, the nodes can be energy generators such as power plants and consumers, such as towns, cities, industrial complexes, shopping centers, etc. The links include energy delivery systems including high-voltage transmission lines, substations, local energy distribution lines, etc. The flow rates and link capacity can be expressed in terms of peak energy demand, average energy demand, etc.

In the case of fluidic or biological networks, the nodes can be sources and consumers of material, such as oil, gas, nutrients, blood, etc., and the link capacity can be the sizes of conduits or vessels carrying the fluids or biological materials, the pressure in such conduits or vessels, etc. In some cases, the capacity and/or rate of flow in one or more conduits/vessels can be adjusted by shutting off or pruning other conduits/vessels. The flow rate optimization and/or capacity planning can thus be used to manage or control irrigation systems, fertilizer delivery system, plant/crop disease control systems, etc.

After collecting the required information, the Gradient-Graph that includes various flow and link gradients is generated using aspects of Algorithms 1A or 1B (FIG. 3A or 3B). The derivation of the GradientGraph may include efficient memory allocation, as described. For one or more links and/or flows of interest the respective leaps and folds are then computed using aspects of Algorithm 2 (FIG. 2C). Using the leaps and folds, one or more flows and/or one or more links may be selected for traffic shaping, e.g., for an adjustment to a property of the selected flow(s) or link(s). In particular, the rate of a flow may be decreased up to a corresponding leap and/or the allotted capacity of a link may be increased or decreased. It should be noted that the allotted capacity of link cannot exceed the physical capacity of the link.

The effect of this perturbation can be observed on the flow(s) and/or link(s) of interest, and the process may be repeated a specified number of times, until a desired effect (e.g., increase in the rate of a flow of interest) is attained, or a maximum feasible change can be attained. Such iterations may be performed under constraints, such as not permitting the flow rate of any flow below the current minimum or a specified lower-bound rate, maintaining the relative order of the flow rates, allotting at least a specified lower-bound capacity to each link, etc.

Figure 4:
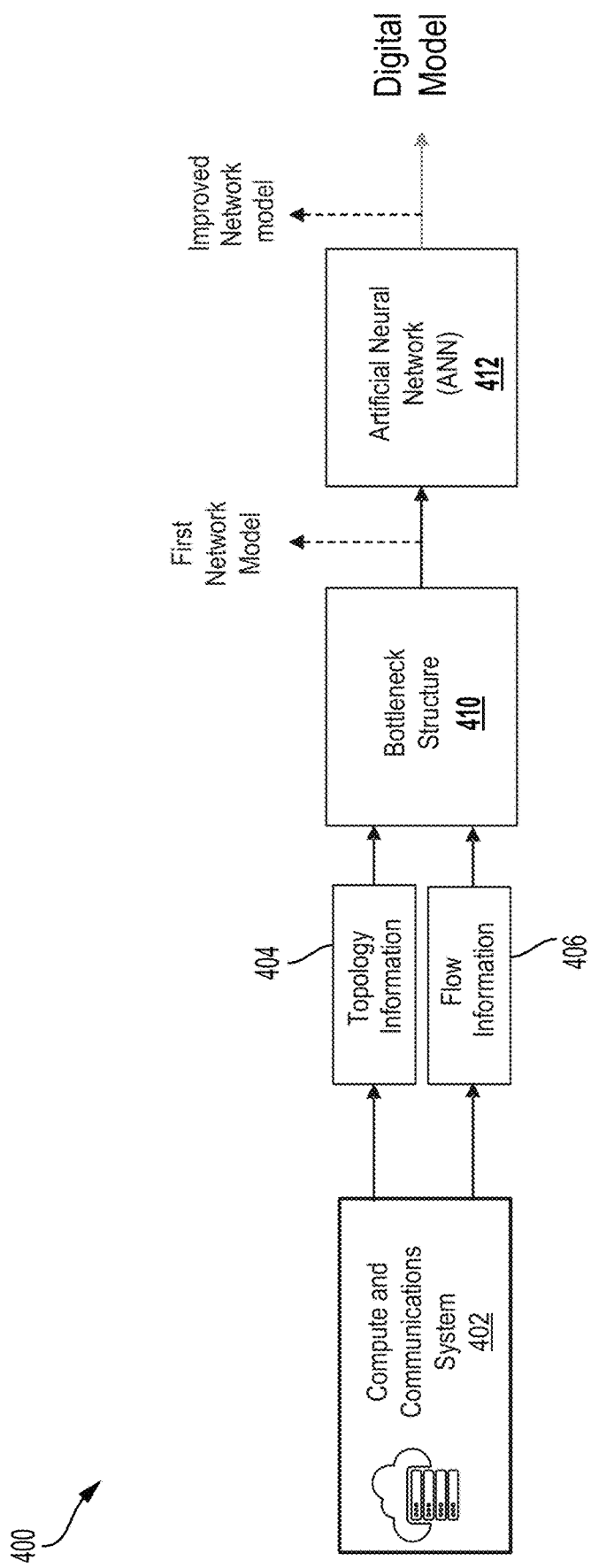
FIG. 4 is a block diagram illustrating an architecture for generating a digital model of a compute and communications system using a bottleneck structure, in accordance with various aspects of the present disclosure.

FIG. 4 is a block diagram illustrating an architecture 400 for generating a digital model of a compute and communications system using a bottleneck structure, in accordance with various aspects of the present disclosure. Referring to FIG. 4, the architecture 400 may include a bottleneck structure 410 and an artificial neural network 412. The bottleneck structure 410 may be configured and function as described (e.g., as described with reference to FIG. 2A). The artificial neural network 412 may comprise a graph neural network, for example.

The architecture 400 may receive as an input, a compute and communications system 402. The compute and communications system 402 may include multiple interconnected elements. For instance, the compute and communications system 402 may be a wireless telecommunications system (e.g., 5G new radio network), a data center network (e.g., a fat-tree network, folded-Clos, or a dragonfly-type network) or an Edge Cloud computing system, for instance.

The architecture 400 may extract information about the topology T 404 and data flows F 406 of the compute and communications system 402. The topology T 404 may include information indicating how the elements of the system are connected to each other. The data flows F 406 may include information indicating how data routes from one element to another within the system.

The bottleneck structure 410 may be computed using the GradientGraph procedure (e.g., shown in FIG. 2A). The GradientGraph procedure may perform calculations based on the topology information 404 and the flow information 406. Using the topology information 404 and the flow information 406, the GradientGraph procedure may infer an information rate for each data flow of the compute and communications system 402. The information rate may be considered the rate at which information moves through a certain path from a source element to a destination element within the compute and communications system 402. This bottleneck structure 410, together with the inferred information rate (e.g., estimated information rate), may serve as a first network model of the network architecture 400. The first network model may be used to aid decision making in engineering tasks such as flow scheduling, capacity planning, data routing, system design, resilience analysis and other tasks.

The first model (e.g., the bottleneck structure 410 and the estimated information rate) may then be supplied to the artificial neural network (ANN) 412. The ANN 412 may be configured to improve the first network model's inferences, making the inferences (e.g., information rate estimates) closer to reality by considering other metrics such as flow latency or packet drop probability. For instance, in some aspects, the ANN may comprise a graph neural network (GNN) such as a graph convolutional network or a graph attention network, for example. The combination of the ANN 412 and the bottleneck structure 410 may thus produce a digital model (may be referred to as a digital twin) of the compute and communications system 402.

Figure 5:
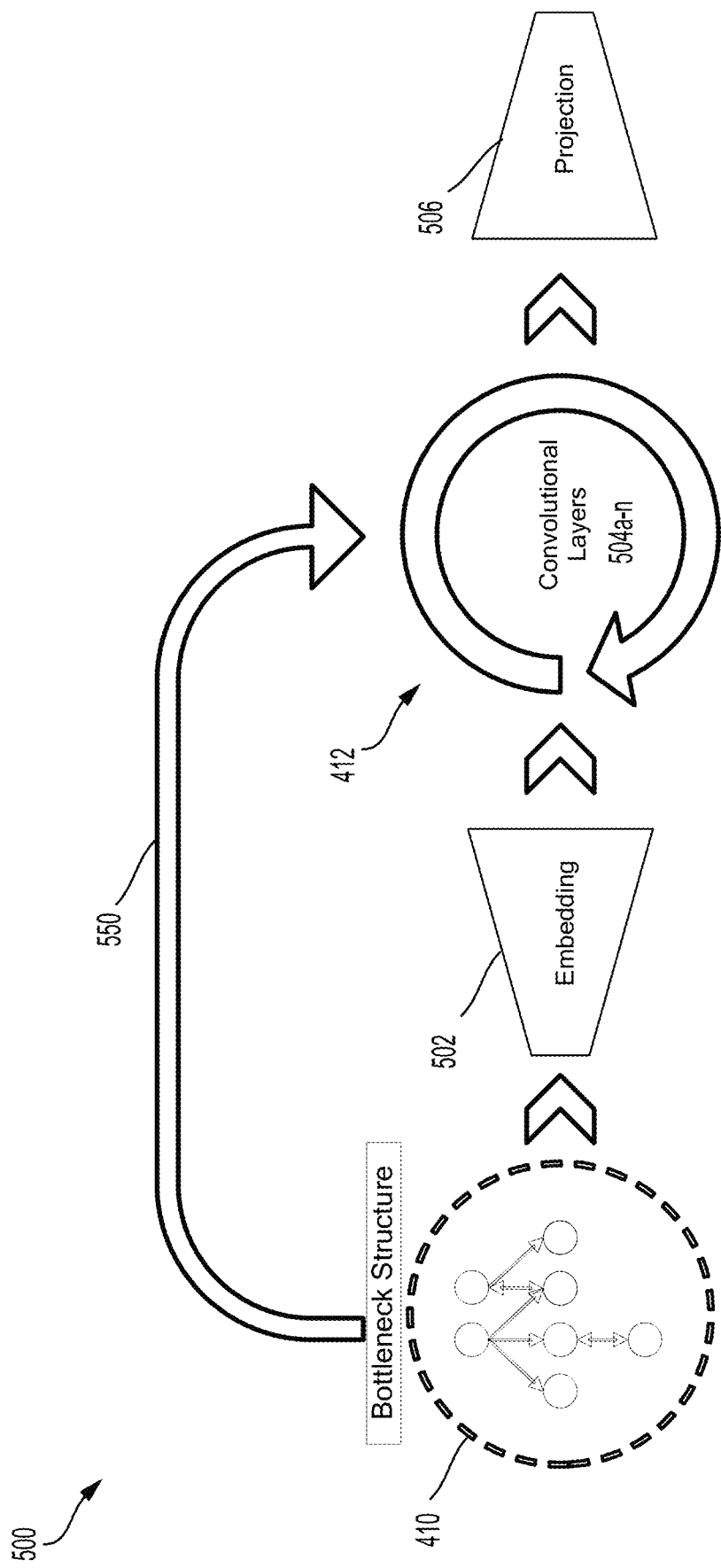
FIG. 5 is a block diagram illustrating an example architecture for a digital model of a compute and communications system in accordance with various aspects of the present disclosure.

FIG. 5 is a block diagram illustrating an example architecture for a digital model 500 of a compute and communications system, in accordance with various aspects of the present disclosure. As shown in FIG. 5, the bottleneck structure 410, its flow rate estimates, and information associated with the communication system may be embedded into a high dimensional vector called embedding 502. The embedding 502 may be supplied to the ANN 412. The embedding 502 may be processed by convolutional layers 504a-n of the ANN 412. The convolutional layer 504a-n may perform a graph convolution operation, for instance.

Graph convolution is an operation that implements message-passing. In message-passing, there exists a function $[f][\_][e]$ that maps a node state or an edge state to a certain "message", which may then be passed along edges of the graph and aggregated in each receiver node to modify its own state. The disclose techniques may leverage a directed graph that represents a network's (e.g., 402 of FIG. 4) bottleneck structure to pass messages between nodes. Links bottlenecking a flow should have more influence on the flow than links that are not constraining a flow's rate. Similarly, the state of a flow should influence every link that it traverses, but it should have less direct influence on the states of links which it does not traverse.

The ANN 412 can also leverage insights from the bottleneck structure 550 to drive the flow of information through the ANN 412. The output of the ANN 412 may then be projected to a lower dimensional space called projection 506, which may provide the estimates made by the digital model 500 of the communication system.

Figure 6:
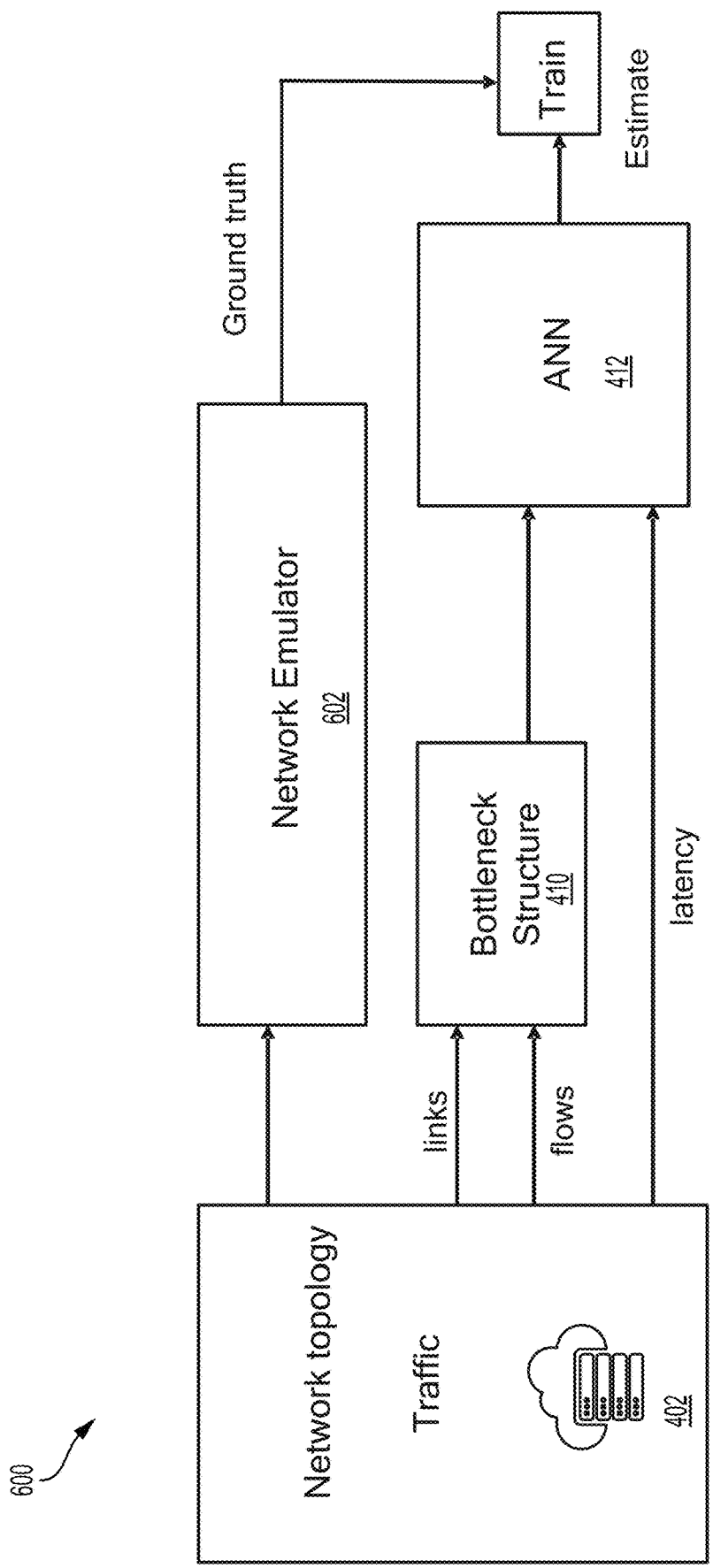
FIG. 6 is a block diagram illustrating an architecture for training the digital model of a compute and communications system using a bottleneck structure, in accordance with various aspects of the present disclosure.

FIG. 6 is a block diagram illustrating an architecture 600 for training the digital model of a compute and communications system using a bottleneck structure, in accordance with various aspects of the present disclosure. As shown in FIG. 6, the architecture 600 may receive as an input the compute and communications system 402. The architecture 600 may receive topology information (e.g., 404) and data flow information (e.g., 406) for the compute and communications system 402. In addition, the architecture 600 may receive network traffic information such as data latency metrics for the compute and communications system 402.

The topology information, data flow information, and traffic information may also be supplied to a network emulator 602. The network emulator 602 may comprise a simulator or production network that may generate an output according to a training dataset. The generated output may serve as a ground truth for training the digital model (the combination of the ANN 412 and the bottleneck structure 410).

The ANN 412 may receive the latency information in addition to the bottleneck structure 410 and estimated information rate for each of the data flows of the compute and communications system 402. The ANN 412 may process the information and generate a throughput estimate for the digital model (e.g., the combination of the bottleneck structure 410 and the ANN 412). The throughput estimate may be compared to the ground truth output by the network emulator to determine an error. In turn, the digital model (e.g., the combination of the bottleneck structure 410 and the ANN 412) may be trained for example using backpropagation to minimize the error.

Accordingly, there are numerous practical applications for the techniques disclosed, including in hardware aware network architecture search, and extended reality (XR) applications, for instance.

In an example, the disclosed techniques may be applied to the development of an advanced Digital Twin architecture that improves on the current state-of-the-art by combining a base mathematical model with the power of artificial intelligence. The digital twin can be used by XR applications to obtain more accurate estimates of the expected 5G network performance towards making optimized multipath selection, rate adaptation and self-managed/autonomic decisions.

In another example, the disclosed techniques may be applied to hardware-aware NAS to help steer the NAS search algorithm towards finding better neural network designs that will yield lower inference latency at a given accuracy level, for instance.

Figure 7:
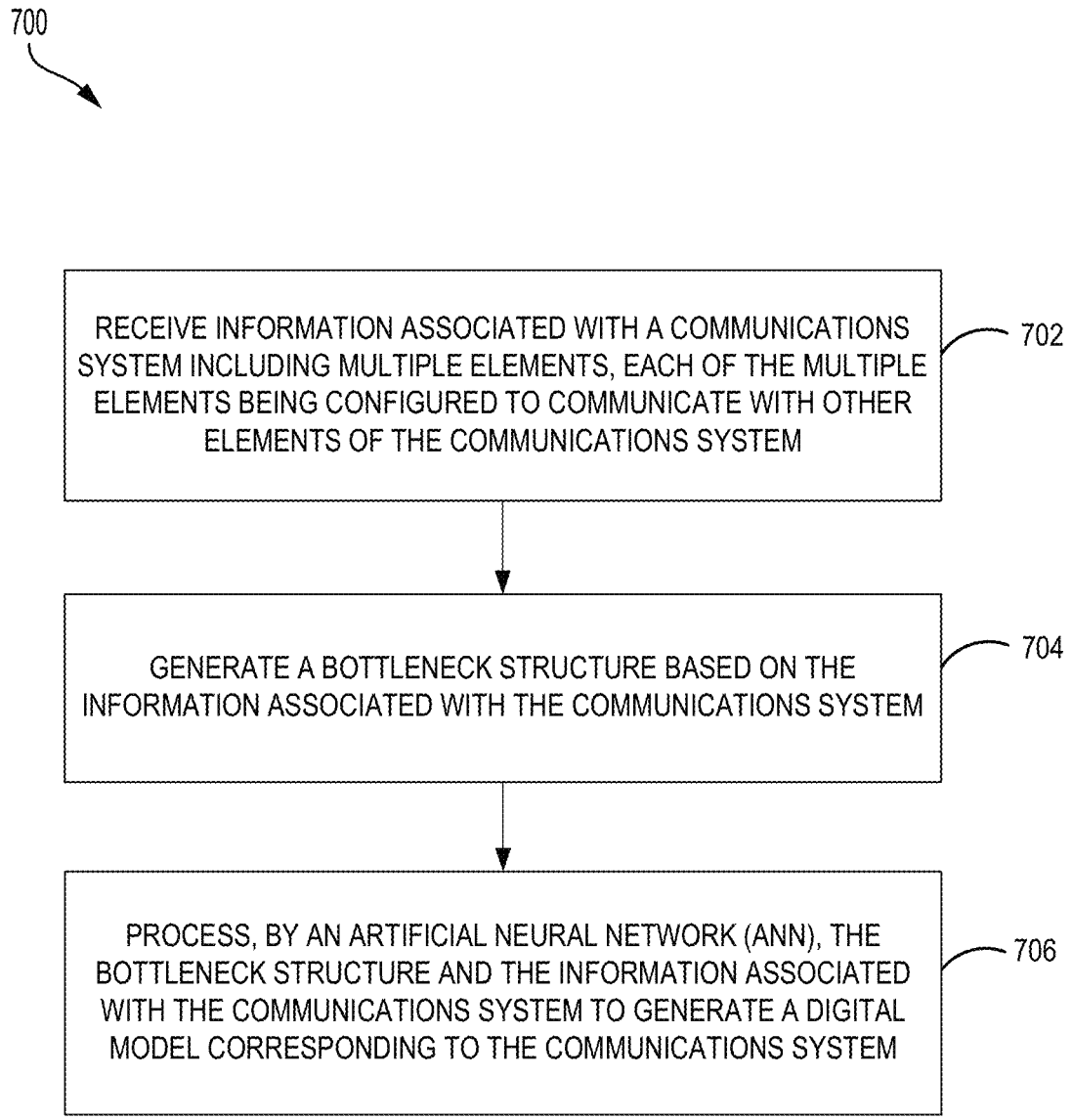
FIG. 7 is a flow diagram illustrating a processor-implemented method for generating a digital model of a communications system using a bottleneck structure, in accordance with various aspects of the present disclosure.

FIG. 7 is a flow diagram illustrating a processor-implemented method 700 for generating a digital model of a communications system using a bottleneck structure, in accordance with aspects of the present disclosure. The processor-implemented method 700 may be performed by a processor such as CPU 102, GPU 104 or NPU 108, for example.

At block 702, the processor receives information associated with a communications system including multiple elements. Each of the multiple elements is configured to communicate with other elements of the communications system. As described with reference to FIG. 4, the architecture 400 may receive as an input, a compute and communications system 402. The compute and communications system 402 may include multiple interconnected elements. For instance, the compute and communications system 402 may be a wireless telecommunications system (e.g., 5G new radio network), a data center network (e.g., a fat-tree network, folded-Clos, or a dragonfly-type network) or an Edge Cloud computing system, for instance.

The information associated with the communications system may comprise topology and flow information, for example. In some aspects, the information may include one or more of a flow latency or a packet drop probability for the communications system.

At block 704, the processor generates a bottleneck structure based on the information associated with the communications system. For example, as described with reference to FIG. 4. The bottleneck structure 410 may be computed using the GradientGraph procedure (e.g., shown in FIG. 2A). The GradientGraph procedure may perform calculations based on the topology information 404 and the flow information 406. Using the topology information 404 and the flow information 406, the GradientGraph procedure may infer an information rate for each data flow of the compute and communications system 402.

At block 706, the processor processes, by an artificial neural network (ANN), the bottleneck structure and the information associated with the communications system to generate a digital model corresponding to the communications system. For instance, as described with reference to FIG. 4, the ANN 412 may receive the first model (e.g., the bottleneck structure 410 and the estimated information rate). The ANN 412 may be configured to improve the first network model's inferences, making the inferences (e.g., information rate estimates) closer to reality by considering other metrics such as flow latency or packet drop probability.

In some aspects, the ANN may comprise a graph neural network (GNN) such as a graph convolutional network or a graph attention network, for example. The combination of the ANN 412 and the bottleneck structure 410 may thus produce a digital model (may be referred to as a digital twin) of the compute and communications system 402. The bottleneck structure 410, its flow rate estimates, and information associated with the communication system may be embedded into a high dimensional vector called embedding 502. The embedding 502 may be supplied to the ANN 412. The embedding 502 may be processed by convolutional layers 504$a$-$n$ of the ANN 412. The convolutional layer 504$a$-$n$ may perform a graph convolution operation, for instance. Accordingly, the ANN may leverage information provided by the bottleneck structure 410 to generate the digital model. In some aspects, the ANN the bottleneck structure is represented by a directed graph to implement message passing between nodes of the directed graph, wherein the nodes of the directed graph represent the multiple elements of the communications system.

Implementation examples are provided in the following numbered clauses.

1. A processor-implemented method, comprising:
    receiving information associated with a communications system including multiple elements, each of the multiple elements being configured to communicate with other elements of the communications system;
    generating a bottleneck structure based on the information associated with the communications system; and
    processing, by an artificial neural network (ANN), the bottleneck structure and the information associated with the communications system to generate a digital model corresponding to the communications system.
2. The processor-implemented method of clause 1, in which the ANN generates flow rate estimates and link bandwidth utilization.
3. The processor-implemented method of clause 1 or 2, in which the information associated with the communications system comprises topology and flow information.
4. The processor-implemented method of any of clauses 1-3, in which the information associated with the communications system comprises one or more of a flow latency or a packet drop probability.
5. The processor-implemented method of any of clauses 1-4, in which the ANN comprises a graph neural network (GNN).
6. The processor-implemented method of any of clauses 1-5, in which the ANN leverages information provided by the bottleneck structure to generate the digital model.
7. The processor-implemented method of any of clauses 1-6, in which the ANN leverages the bottleneck structure represented by a directed graph to implement message passing between nodes of the directed graph, wherein the nodes of the directed graph represent the multiple elements of the communications system.
8. The processor-implemented method of any of clauses 1-7, in which the communications system comprises one of a wireless telecommunications network, a datacenter network, a wide area network, and edge cloud, a local area network, a cluster of computing devices connecter by a network, or a network-on-chip in a microprocessor.
9. An apparatus, comprising:
    a memory; and
    at least one processor coupled to the memory, the at least one processor being configured:

to receive information associated with a communications system including multiple elements, each of the multiple elements being configured to communicate with other elements of the communications system;

to generate a bottleneck structure based on the information associated with the communications system; and to processing, by an artificial neural network (ANN), the bottleneck structure and the information associated with the communications system to generate a digital model corresponding to the communications system.

10. The apparatus of clause 9, in which the ANN generates flow rate estimates and link bandwidth utilization.

11. The apparatus of clause 9 or 10, in which the information associated with the communications system comprises topology and flow information.

12. The apparatus of any of clauses 9-11, in which the information associated with the communications system comprises one or more of a flow latency or a packet drop probability.

13. The apparatus of any of clauses 9-12, in which the ANN comprises a graph neural network (GNN).

14. The apparatus of any of clauses 9-13, in which the ANN leverages information provided by the bottleneck structure to generate the digital model.

15. The apparatus of any of clauses 9-14, in which the ANN leverages the bottleneck structure represented by a directed graph to implement message passing between nodes of the directed graph, wherein the nodes of the directed graph represent the multiple elements of the communications system.

16. The apparatus of any of clauses 9-15, in which the communications system comprises one of a wireless telecommunications network, a datacenter network, a wide area network, and edge cloud, a local area network, a cluster of computing devices connecter by a network, or a network-on-chip in a microprocessor.

17. A non-transitory computer readable medium having encoded thereon program code, the program code being executed by a processor and comprising program code to receive information associated with a communications system including multiple elements, each of the multiple elements being configured to communicate with other elements of the communications system;

program code to generate a bottleneck structure based on the information associated with the communications system; and program code to process, by an artificial neural network (ANN), the bottleneck structure and the information associated with the communications system to generate a digital model corresponding to the communications system.

18. The non-transitory computer readable medium of clause 17, in which the ANN generates flow rate estimates and link bandwidth utilization.

19. The non-transitory computer readable medium of clause 17 or 18, in which the information associated with the communications system comprises topology and flow information.

20. The non-transitory computer readable medium of any of clauses 17-19, in which the information associated with the communications system comprises one or more of a flow latency or a packet drop probability.

21. The non-transitory computer readable medium of any of clauses 17-20, in which the ANN comprises a graph neural network (GNN).

22. The non-transitory computer readable medium of any of clauses 17-21, in which the ANN leverages information provided by the bottleneck structure to generate the digital model.

23. The non-transitory computer readable medium of any of clauses 17-22, in which the ANN leverages the bottleneck structure represented by a directed graph to implement message passing between nodes of the directed graph, wherein the nodes of the directed graph represent the multiple elements of the communications system.

24. The non-transitory computer readable medium of any of clauses 17-23, in which the communications system comprises one of a wireless telecommunications network, a datacenter network, a wide area network, and edge cloud, a local area network, a cluster of computing devices connecter by a network, or a network-on-chip in a microprocessor.

25. An apparatus, comprising:

means for receiving information associated with a communications system including multiple elements, each of the multiple elements being configured to communicate with other elements of the communications system;

means for generating a bottleneck structure based on the information associated with the communications system; and means for processing, by an artificial neural network (ANN), the bottleneck structure and the information associated with the communications system to generate a digital model corresponding to the communications system.

26. The apparatus of clause 25, in which the ANN generates flow rate estimates and link bandwidth utilization.

27. The apparatus of clause 25 or 26, in which the information associated with the communications system comprises topology and flow information.

28. The apparatus of any of clauses 25-27, in which the information associated with the communications system comprises one or more of a flow latency or a packet drop probability.

29. The apparatus of any of clauses 25-28 in which the ANN leverages information provided by the bottleneck structure to generate the digital model.

30. The apparatus of any of clauses 25-29, in which the ANN leverages the bottleneck structure represented by a directed graph to implement message passing between nodes of the directed graph, wherein the nodes of the directed graph represent the multiple elements of the communications system.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some aspects, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific aspects thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the aspects disclosed herein, can include practices otherwise than specifically described, and are to be interpreted as broadly as allowed under the law.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed:

1. A processor-implemented method performed by one or more processors, comprising:
   receiving information associated with a communications system including multiple elements, each of the multiple elements being configured to communicate with other elements of the communications system and the information associated with the communications system including topology information and flow information;
   determining an information rate estimate based on the topology information and the flow information;
   generating a bottleneck structure based on the information associated with the communications system, the bottleneck structure comprising a computational graph characterizing a state of the communications system with flows and links, the links offering communications resources with a limited capacity and the flows making use of the communications resources, the bottleneck structure revealing interactions of bottleneck links and system-wide ripple effects caused by perturbations in the communications system;
   generating an embedding based on the information rate estimate and the bottleneck structure; and
   processing, by an artificial neural network (ANN), the embedding over one or more convolutional layers to generate a digital model corresponding to the communications system.

2. The processor-implemented method of claim 1, in which the ANN generates flow rate estimates and link bandwidth utilization.

3. The processor-implemented method of claim 2, in which the information associated with the communications system comprises one or more of a flow latency or a packet drop probability.

4. The processor-implemented method of claim 1, in which the ANN comprises a graph neural network (GNN).

5. The processor-implemented method of claim 1, in which the ANN leverages information provided by the bottleneck structure to generate the digital model.

6. The processor-implemented method of claim 1, in which the ANN leverages the bottleneck structure represented by a directed graph to implement message passing between nodes of the directed graph, wherein the nodes of the directed graph represent multiple elements of the communications system including the links and the flows.

7. The processor-implemented method of claim 1, in which the communications system comprises one of a wireless telecommunications network, a datacenter network, a wide area network, an edge cloud, a local area network, a cluster of computing devices connected by a network, or a network-on-chip in a microprocessor.

8. An apparatus, comprising:
   at least one memory; and
   at least one processor coupled to the at least one memory, the at least one processor being configured to:
      receive information associated with a communications system including multiple elements, each of the multiple elements being configured to communicate with other elements of the communications system and the information associated with a communications system including topology information and flow information;
      determine an information rate estimate based on the topology information and the flow information;
      generate a bottleneck structure based on the information associated with the communications system, the bottleneck structure comprising a computational graph characterizing a state of the communications system with flows and links, the links offering communications resources with a limited capacity and the flows making use of the communications resources, the bottleneck structure revealing interactions of bottleneck links and system-wide ripple effects caused by perturbations in the communications system;

generate an embedding based on the information rate estimate and the bottleneck structure; and process, by an artificial neural network (ANN), the embedding over one or more convolutional layers of the ANN to generate a digital model corresponding to the communications system.

9. The apparatus of claim 8, in which the ANN generates flow rate estimates and link bandwidth utilization.

10. The apparatus of claim 9, in which the information associated with the communications system comprises one or more of a flow latency or a packet drop probability.

11. The apparatus of claim 8, in which the ANN comprises a graph neural network (GNN).

12. The apparatus of claim 8, in which the ANN leverages information provided by the bottleneck structure to generate the digital model.

13. The apparatus of claim 8, in which the ANN leverages the bottleneck structure represented by a directed graph to implement message passing between nodes of the directed graph, wherein the nodes of the directed graph represent multiple elements of the communications system including the links and the flows.

14. The apparatus of claim 8, in which the communications system comprises one of a wireless telecommunications network, a datacenter network, a wide area network, an edge cloud, a local area network, a cluster of computing devices connected by a network, or a network-on-chip in a microprocessor.

15. A non-transitory computer readable medium having encoded thereon program code, the program code being executed by one or more processors and comprising:

program code to receive information associated with a communications system including multiple elements, each of the multiple elements being configured to communicate with other elements of the communications system and the information associated with the communications system including topology information and flow information;

program code to determine an information rate estimate based on the topology information and the flow information;

program code to generate a bottleneck structure based on the information associated with the communications system, the bottleneck structure comprising a computational graph characterizing a state of the communications system with flows and links, the links offering communications resources with a limited capacity and the flows making use of the communications resources, the bottleneck structure revealing interactions of bottleneck links and system-wide ripple effects caused by perturbations in the communications system;

program code to generate an embedding based on the information rate estimate and the bottleneck structure; and program code to process, by an artificial neural network (ANN), the embedding over one or more convolutional layers of the ANN to generate a digital model corresponding to the communications system.

16. The non-transitory computer readable medium of claim 15, in which the ANN generates flow rate estimates and link bandwidth utilization.

17. The non-transitory computer readable medium of claim 16, in which the information associated with the communications system comprises one or more of a flow latency or a packet drop probability.

18. The non-transitory computer readable medium of claim 15, in which the ANN comprises a graph neural network (GNN).

19. The non-transitory computer readable medium of claim 15, in which the ANN leverages information provided by the bottleneck structure to generate the digital model.

20. The non-transitory computer readable medium of claim 15, in which the ANN leverages the bottleneck structure represented by a directed graph to implement message passing between nodes of the directed graph, wherein the nodes of the directed graph represent multiple elements of the communications system including the links and the flows.

21. The non-transitory computer readable medium of claim 15, in which the communications system comprises one of a wireless telecommunications network, a datacenter network, a wide area network, an edge cloud, a local area network, a cluster of computing devices connected by a network, or a network-on-chip in a microprocessor.

22. An apparatus, comprising:

means for receiving information associated with a communications system including multiple elements, each of the multiple elements being configured to communicate with other elements of the communications system and the information associated with the communications system including topology information and flow information;

means for determining an information rate estimate based on the topology information and the flow information;

means for generating a bottleneck structure based on the information associated with the communications system, the bottleneck structure comprising a computational graph characterizing a state of the communications system with flows and links, the links offering communications resources with a limited capacity and the flows making use of the communications resources, the bottleneck structure revealing interactions of bottleneck links and system-wide ripple effects caused by perturbations in the communications system;

means for generating an embedding based on the information rate estimate and the bottleneck structure; and means for processing, by an artificial neural network (ANN), the embedding over one or more convolutional layers of the ANN to generate a digital model corresponding to the communications system.

23. The apparatus of claim 22, in which the ANN generates flow rate estimates and link bandwidth utilization.

24. The apparatus of claim 23, in which the information associated with the communications system comprises one or more of a flow latency or a packet drop probability.

25. The apparatus of claim 22, in which the ANN leverages information provided by the bottleneck structure to generate the digital model.

26. The apparatus of claim 22, in which the ANN leverages the bottleneck structure represented by a directed graph to implement message passing between nodes of the directed graph, wherein the nodes of the directed graph represent multiple elements of the communications system including the links and the flows.

* * * * *